United States Patent [19]

Baker et al.

[11] 4,147,368  
[45] Apr. 3, 1979

[54] PIPE SEAL

[75] Inventors: Clifford A. Baker, Glen Waverley; Norwood L. Harrison, Mount Waverley, both of Australia

[73] Assignee: Humes Limited, Melbourne, Australia

[21] Appl. No.: 746,318

[22] Filed: Dec. 1, 1976

Related U.S. Application Data

[63] Continuation of Ser. No. 565,610, Apr. 7, 1975, abandoned.

[30] Foreign Application Priority Data

Apr. 5, 1974 [AU] Australia ............... 7179/74

[51] Int. Cl.² .............................. F16J 15/12
[52] U.S. Cl. .................................. 277/182; 138/109; 277/207 A
[58] Field of Search ............... 277/182, 188 A, 189, 277/207 R, 207 A, 180, 207 B; 138/109

[56] References Cited

U.S. PATENT DOCUMENTS

| 2,146,641 | 2/1939 | McWane | 277/207 A |
| 2,314,386 | 3/1943 | Brend | 277/207 A |
| 2,455,982 | 12/1948 | Dowty | 277/180 |
| 2,647,810 | 8/1953 | McCuistion | 277/177 |
| 3,027,179 | 3/1962 | Wiltse | 285/DIG. 19 |
| 3,118,681 | 1/1964 | Fuehrer | 277/157 |
| 3,185,490 | 5/1965 | Gagne | 277/207 A |
| 3,186,741 | 6/1965 | Kurtz | 285/230 X |
| 3,741,570 | 6/1973 | Garrett | 277/207 A |

FOREIGN PATENT DOCUMENTS

| 1138633 | 1/1957 | France | 277/164 |
| 1141249 | 3/1957 | France | 277/179 |

Primary Examiner—William D. Martin, Jr.
Attorney, Agent, or Firm—Haseltine, Lake & Waters

[57] ABSTRACT

This invention relates to a pipe seal or joint, and refers especially to a seal between an inner tubular surface and an outer tubular surface. The invention is concerned particularly, but is not limited, to seals of the O-ring or D-ring type employed in the joining of concrete pipes, for example for use between the spigot of one pipe and the socket of an adjacent pipe. The invention is applicable to the seals or joints between inner and outer tubular surfaces, such as pipes or other members, in which a sealing member is located in a recess formed in the outer surface, or in the body forming the outer surface.

9 Claims, 6 Drawing Figures

U.S. Patent Apr. 3, 1979 4,147,368
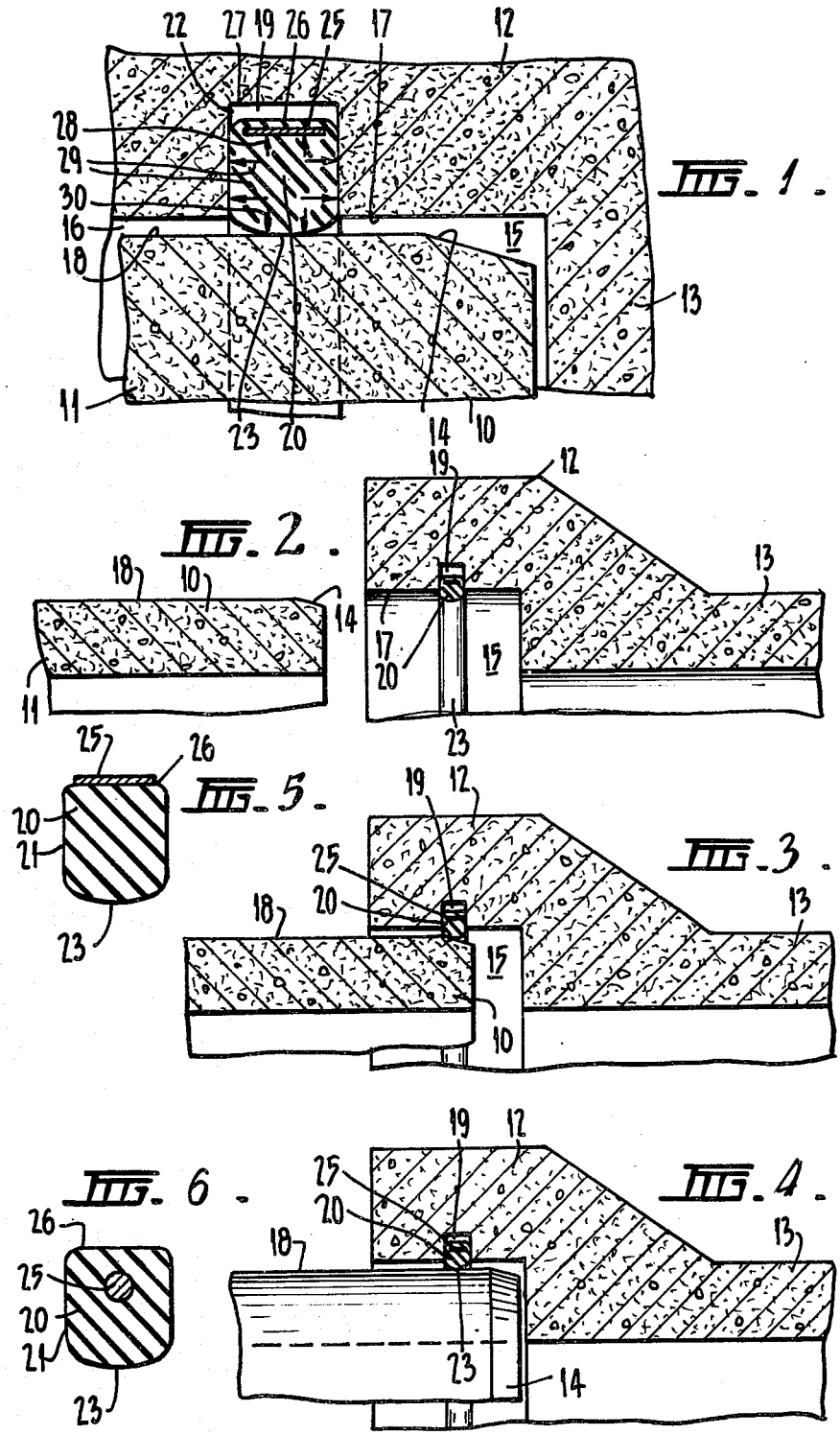

PIPE SEAL

This is a continuation of application Ser. No. 565,610, filed Apr. 7, 1975, now abandoned.

The term "tubular" in this specification includes cylindrical and non-cylindrical continuous curved surfaces, such as ovoid or oval surfaces or bodies, but in most applications cylindrical surfaces are implied.

In the jointing of pipes, particularly concrete pipes, there is usually a socket which receives a spigot, either the socket or spigot having retaining means in which there is located an O-ring seal or the like.

The seals have conventionally been compressable and the seal between the socket and spigot is made by radial forces acting inwardly on the spigot and outwardly on the socket.

In order for such seals to be practically successful two criteria have to be met. Firstly, the socket has had to be sufficiently robust to accept the outwardly radial force without damage to the socket, and secondly, the range of tolerances between the spigot and the socket has had to be relatively fine, firstly to permit an interconnection which provides a good seal, secondly to ensure that when such a connection is made the outward radial forces on the socket are within the design limits of the socket.

It is an object of the present invention to provide an improved form of pipe connection and seal which reduces the previous disadvantages, and enables improvements to be made in the design and construction of pipe seals, and in the effectiveness thereof, while a further object is to provide a pipe seal which is applicable also to the provision of an improved seal between the inner and outer tubular surfaces of other types of spaced members.

According to one form of the invention we provide a pipe seal for effecting a seal between the outer tubular surface of an inner member and the inner tubular surface of an outer member, which comprises an annular sealing member which fits into an annular recess in the outer member and the inner surface of which is in pressure contact with the outer tubular surface of the inner member, the said annular sealing member being formed of resilient material and having an annular non-extendable member which substantially absorbs the outward radial forces resulting from the compression of the annular sealing member and which substantially prevents the transmission of the said radial forces to the outer member.

The non-extendable member, which may be formed of metal, may be in contact with the outer surface of the annular resilient sealing member, or may be embedded therein, and may be located at any suitable position within the body of the resilient sealing member but is preferably located closer to the outer periphery of the sealing member than to its inner periphery.

The non-extendable member substantially absorbs, and in some cases may eliminate, the outward radial forces exerted by the resilient sealing member and at the same time increases the longitudinal forces (that is, the forces acting in a direction parallel to the tubular surfaces and at right angles to the radial forces) between the resilient sealing member and the side walls of the annular recess in the outer member in which the main part of the sealing member is located. This improves the effectiveness of the seal.

In the case of a seal between a spigot on one pipe which is to be sealed within an outer socket on the end of another pipe to which the first pipe is to be joined, the invention has the considerable advantage that by reducing the outward radial force of the sealing member on the socket, the radial thickness of the socket can be substantially reduced without detrimentally affecting the pipe joint or seal, which enables substantial economies to be achieved.

In order that the invention may be more readily understood we shall describe certain embodiments of the invention as applied to concrete pipes, although it is to be understood that the invention is not restricted to such limited applications.

In the embodiments shown in the accompanying drawings:

FIG. 1 is a diagrammatic view in cross-section of a pipe seal according to the invention used for jointing the spigot of one pipe and the socket of an adjacent pipe FIG. 2 is a sectional view similar to FIG. 1, showing the pipes prior to joining, FIG. 3 is a sectional view similar to FIG. 2 wherein the spigot of one pipe is shown entering the socket of the second pipe, FIG. 4 is a sectional view similar to FIG. 1 but to a reduced scale showing the two pipes joined and sealed, FIG. 5 is a sectional view of one type of sealing ring according to the invention, and FIG. 6 is a sectional view of another type of sealing ring according to the invention.

Referring to the drawings, reference numeral (10) represents the spigot end of a first pipe (11) which is to be joined to the socket end (12) of a second pipe (13). In the drawings these pipes are shown as concrete pipes, but the pipes may be formed of other materials.

The spigot (10) of pipe (11) is formed at its end with an inwardly tapered peripheral face (14). The reference numeral (15) indicates the cylindrical recess in the socket end (12) of the pipe (13) into which the spigot (10) is adapted to fit. An annular space (16) exists between the inner tubular face (17) of the socket end (12) and the outer tubular surface (18) of the pipe (11).

A rectangular recess (19) is formed in the internal surface of the socket end (12) of the pipe (13) and an annular sealing member (20), which is formed of rubber or other resilient material, is fitted within the recess (19). The annular sealing member (20) may comprise an O-ring or D-ring or may be of any other suitable shape, but is conveniently of the shape shown in FIGS. 5 and 6.

The side walls (21) of the annular sealing member (20) may be flat or curved and are preferably in pressure contact with the side walls (22) of the recess (19) when the annular member (20) is fitted into the recess. If the side walls (21) of the member (20) are curved before the member is inserted in the recess (19), they will normally assume a flat configuration when in pressure contact with the side walls (22).

The annular sealing member (20) completely surrounds the spigot (10) of the pipe (11) and is of such dimensions that the inner curved surface (23) of the sealing member (20) is in pressure contact with the outer tubular surface (18) of the spigot (10) when the spigot has been fully inserted into the socket (12).

The annular sealing member (20) is provided with an annular non-extendable member (25) which may be formed of metal or other substantially non-extendable material, and is of continuous, preferably circular, shape. The non-extendable member (25) may comprise a flat bar or strip as shown in FIGS. 1 to 5, or it may comprise a wire or similar member of cylindrical or other suitable cross-sectional shape as shown in FIG. 6.

The non-extendable member (25) may be embedded in the material of the sealing member (20), preferably at or near the outer periphery (26) of the sealing member (20) as shown in FIGS. 1 and 4, or may be arranged to surround the outer surface or periphery (26) of the sealing member (20) as shown in FIG. 5 or it may be embedded in the body of the sealing member (20) as shown in FIG. 6. Preferably the non-extendable member (25) is located closer to the outer periphery (26) of the sealing member (20) than to its inner periphery (23).

When the spigot (10) of the pipe (11) is forced into the recess (15) in the socket (12) of the pipe (13) the inclined face (14) of the spigot (10) engages the inner periphery (23) of the sealing member (20), the sealing member (20) being so constructed that its inner periphery (23) is normally of smaller diameter than the outer periphery (18) of the spigot (10). As the spigot (10) is inserted in the socket, the inclined face (14) expands the resilient sealing member (20), as shown in FIG. 3, and forces it outwardly into the recess (19) in the socket (12) so that when the spigot (10) is fully inserted into the socket (12), as shown in FIGS. 1 and 5, the inner periphery (23) of the sealing member (20) is in pressure contact with the outer tubular surface (18) of the spigot (10).

The non-extendable member (25) has the novel effect of absorbing the outward radial forces resulting from the compression of the sealing member (20) and thereby preventing these radial outward forces from being transmitted to the outer periphery (27) of the recess (19) and thereby to the socket (12).

The outer radial forces exerted by the deformable resilient sealing member (20) are absorbed by the non-extendable member (25) as indicated by the arrows (28) in FIG. 1, and are translated into longitudinal forces indicated by the arrows (29) in FIG. 1 which act against the side walls (22) of the recess (19) in the socket member (12), this effect being achieved by deformation of the resilient sealing (20).

It will be appreciated that there is a certain radial component in the forces applied to the sealing member (20) and although pressure is maintained between the sealing member (20) and the outer surface (18) of the spigot (10), as indicated by the arrows (30) in FIG. 1, the main forces are substantially longitudinal of the socket (12) as indicated by the arrows (29) in FIG. 1.

By means of this invention it is possible to manufacture sockets (12) which are substantially thinner for any particular sized pipe than would normally be the case, and in addition the tolerance range available can be very much greater than has been the case previously because more compression of the sealing member adds little if any radial strain to the socket and on less compression of the sealing member a good seal is still made around the edges of the recess in the socket.

By this invention therefore, it is possible to substantially reduce the cost of socket members and of pipe joints and also to improve the effectiveness of sealing means for pipe joints and also for the sealing of spaced tubular members other than pipes.

The radial thickness of the socket (12) may be, due to the use of this invention, substantially less than the radial thickness of the socket of a conventional pipe of the same diameter.

We claim:

1. A pipe sealing arrangement comprising: a pipe spigot with an outer tubular surface; a pipe socket with an inner tubular surface and an annular recess; a resilient annular sealing member which fits into said annular recess in said socket, said recess having a continuous and unbroken outer peripheral wall and having substantially parallel side walls; said sealing member having an inner surface in pressure sealing contact with said outer tubular surface of the spigot; said sealing member having side surfaces in pressure sealing contact with said side walls of the recess; a continuous annular band of fixed length extending around and in contact with said sealing member and absorbing outward radial forces resulting from the compression of said sealing member; said sealing member and said annular band associated therewith being fitted into said recess; a continuous annular space between said outer wall of the recess and said sealing member; said annular space extending over the full width of said recess between said side walls thereof and being maintained after the seal is effected; said sealing member and said band cooperatively inhibiting transmission of radial forces to said outer wall of said recess and thereby inhibiting transmission of radial forces to said socket, said sealing member and said band being stressed and translating said radial forces into an increase of longitudinal sealing forces between said sealing member and said side walls; said sealing member applying inward radial forces forming a seal between said sealing member and said spigot, said radial forces being applied substantially by said sealing member and said annular band, said outer wall of said recess being free of said radial forces; said sealing member being stressed for applying longitudinal forces between said sealing member and said side walls of said annular recess, said longitudinal forces only forming a pressure seal between said sealing member and said sockets; said sealing member applying pressure on said spigot substantially independent of the internal dimensions of said outer wall of said recess and independent of any ovality of said spigot; said pressure applied by said sealing member on said spigot being substantially independent of relative transverse movement of said socket and said spigot, said sealing member and said band having a predetermined stress relationship inhibiting transmission of radial forces to said socket for inhibiting fracture of said socket and reducing the permissible wall thickness of said socket.

2. The pipe seal as defined in claim 1, wherein said annular band of fixed length is in contact with said outer periphery of the annular sealing member.

3. The pipe seal as defined in claim 2, wherein said annular band of fixed length includes a metal band.

4. The pipe seal as defined in claim 1, wherein said annular band of fixed length is embedded in said annular sealing member.

5. The pipe seal as defined in claim 4, wherein said annular band of fixed length is located closer to said outer periphery of the sealing member than to its inner periphery.

6. The pipe seal as defined in claim 1, wherein said spigot is on one end of a concrete pipe and said socket is formed on the end of a second pipe into which said spigot is fitted in order to effect a pipe joint.

7. The pipe seal as defined in claim 6, wherein said spigot is provided on its end with an inwardly tapered peripheral face which engages and expands said annular sealing member when said spigot is forced into said socket.

8. The pipe seal as defined in claim 6, wherein the radial thickness of said socket wall is substantially less than that of the socket of a conventional pipe of the same diameter.

9. The pipe seal as defined in claim 1, wherein said annular band of fixed length is located closer to said outer periphery of said sealing member than to the inner periphery of said sealing member, said annular band of fixed length being embedded in said annular sealing member, said spigot being on one end of a concrete pipe and said socket being formed on the end of a second pipe into which said spigot is fitted, said spigot having on its end an inwardly tapered surface engaging in expanding said annular sealing member when said spigot is forced into said socket, the radial thickness of said socket being substantially less than that of the socket of a conventional pipe of same diameter, said band of fixed length being comprised of metal having a substantially rectangular cross-section with width exceeding substantially the thickness of said rectangular cross-section, said sealing member being comprised of rubber, said sealing member with embedded band of fixed length having a substantially rectangular cross-section with a surface in contact with said spigot having a substantially convex surface when viewed from the exterior thereof.

* * * * *